United States Patent [19]

Bassetti et al.

[11] Patent Number: 4,625,222

[45] Date of Patent: * Nov. 25, 1986

[54] INTERACTING PRINT ENHANCEMENT TECHNIQUES

[75] Inventors: Larry W. Bassetti; Sherwood Kantor, both of Boulder; Janis K. Richert, Longmont, all of Colo.

[73] Assignee: International Business Machines Corporation, Armonk, N.Y.

[*] Notice: The portion of the term of this patent subsequent to Oct. 1, 2002 has been disclaimed.

[21] Appl. No.: 611,561

[22] Filed: May 17, 1984

[51] Int. Cl.[4] ..................... G01D 15/14; G01D 9/42; H04N 1/23

[52] U.S. Cl. .................................. 346/160; 316/108; 316/154; 358/300

[58] Field of Search ................... 346/108 R, 160, 154; 358/298, 300, 302, 283

[56] References Cited

U.S. PATENT DOCUMENTS

| | | | |
|---|---|---|---|
| 4,365,275 | 12/1982 | Berman et al. | 358/283 |
| 4,395,721 | 7/1983 | Ohno et al. | 346/160 |
| 4,396,928 | 8/1983 | Abe et al. | 346/160 |
| 4,437,122 | 3/1984 | Walsh et al. | 358/166 |
| 4,460,909 | 7/1984 | Bassetti et al. | 358/298 X |
| 4,463,364 | 7/1984 | Tamura | 346/160 |

FOREIGN PATENT DOCUMENTS 3025267 1/1981 Fed. Rep. of Germany .

OTHER PUBLICATIONS

*IBM Technical Disclosure Bulletin*, "Improving Resolution of a Laser Beam Printer", R. J. Froess & F. L. Wade, vol. 26, No. 3B, Aug. 83, pp. 1572-1573.

*Primary Examiner*—George H. Miller, Jr.
*Assistant Examiner*—Linda M. Peco
*Attorney, Agent, or Firm*—Charles E. Rohrer

[57] ABSTRACT

Print enhancement circuits for an electrophotographic printing machine are placed between the character generator and the printhead to modify drive signals for the printhead. Modifications include smoothing the digitized edges of slanted lines; broadening single pel width lines in the direction perpendicular to the scan direction as well as in the direction parallel to scan. Inhibiting circuits are provided to prevent passage of enhancement signals under certain conditions. Generally, leading and trailing edge gray signals are provided next to all black data in a direction parallel to scan while expanded black signals are provided for the single pel data in a direction perpendicular to scan by adding to the black signal on both its leading and trailing edges.

When a single picture element (pel) area contains two added black signals, both are passed; when a single pel area contains one added black signal and one gray signal, both are passed; when a single pel area contains two gray signals, only the leading gray signal is passed; and when a single pel area contains two added black signals and a gray signal, only the gray signal is passed.

54 Claims, 35 Drawing Figures

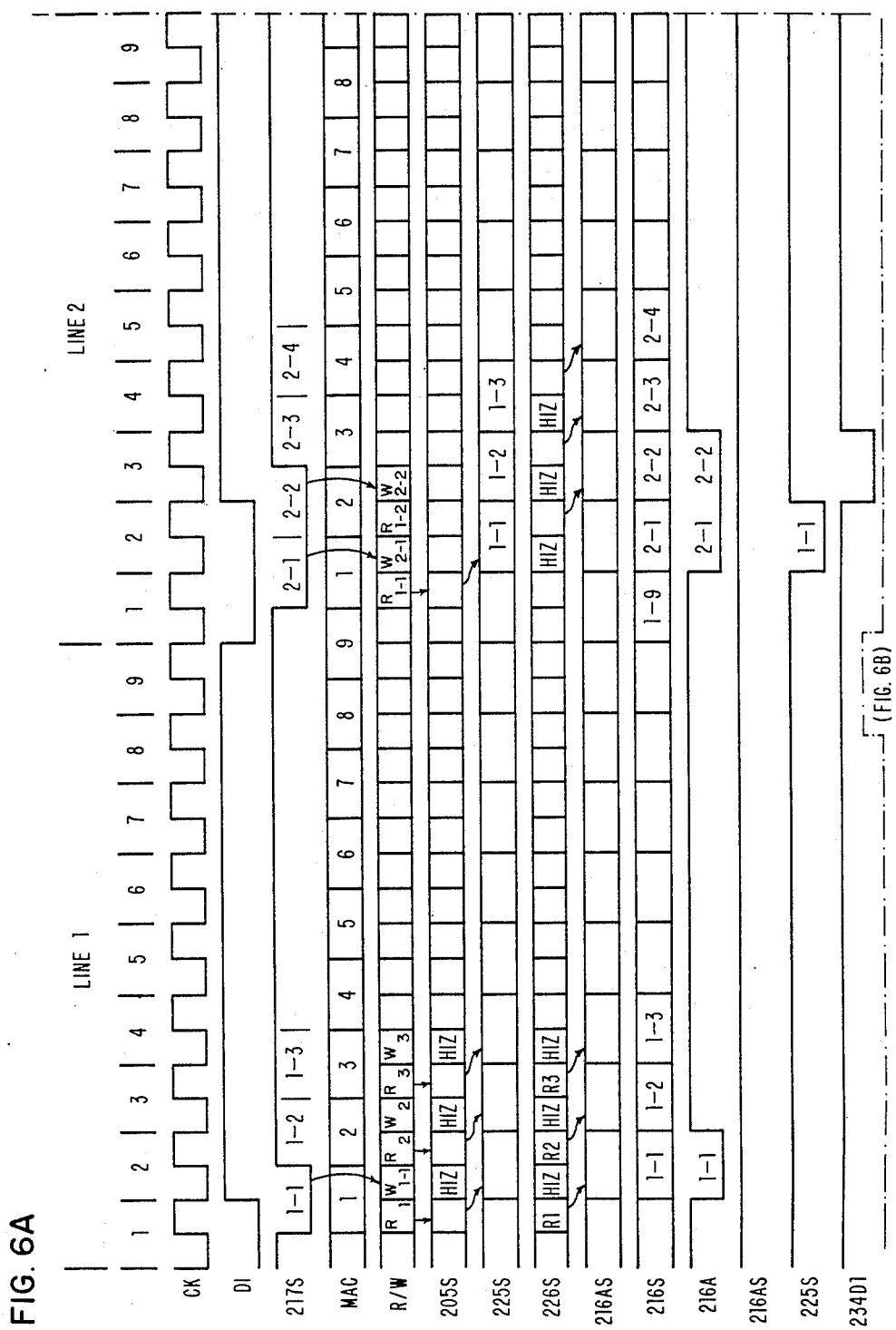

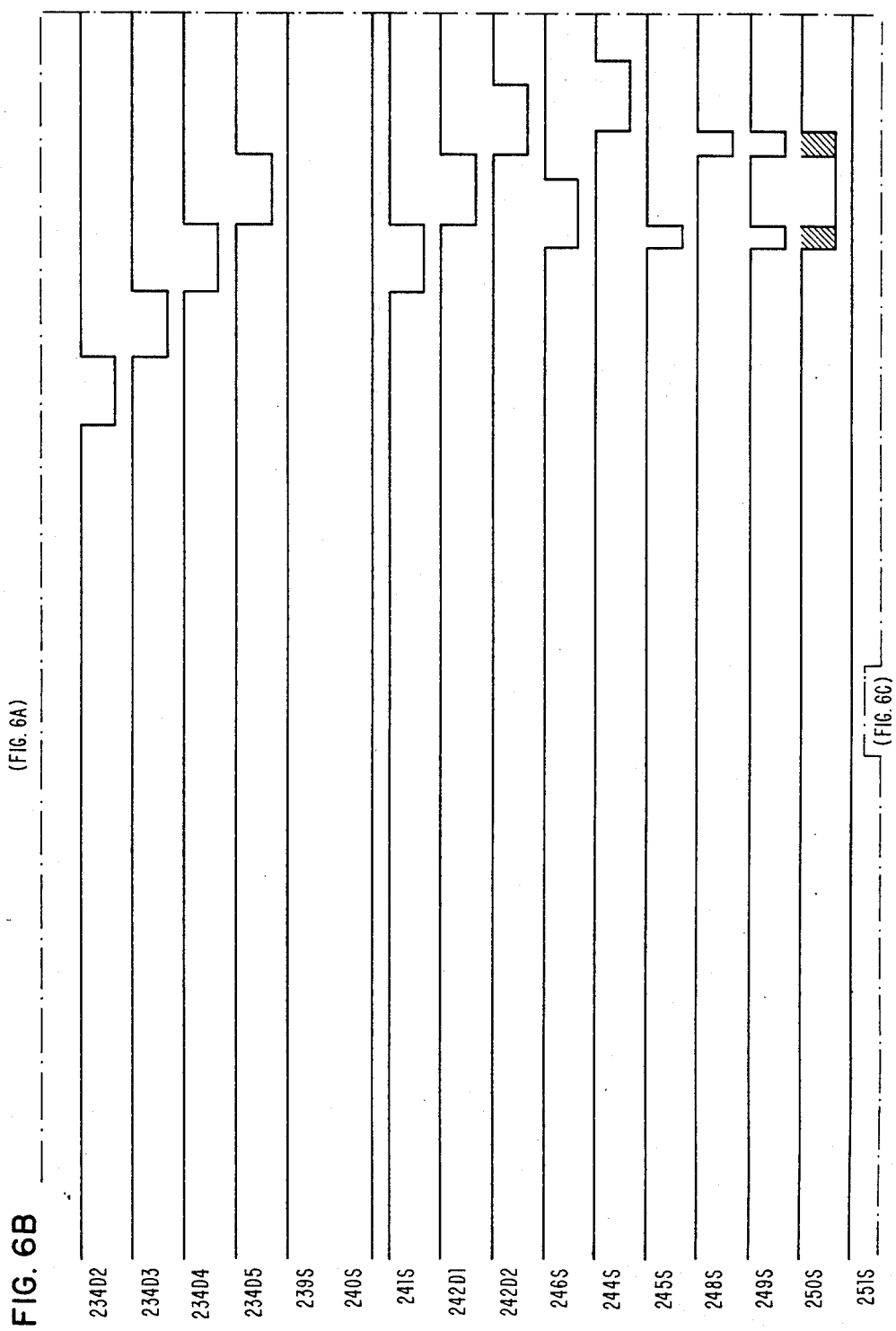

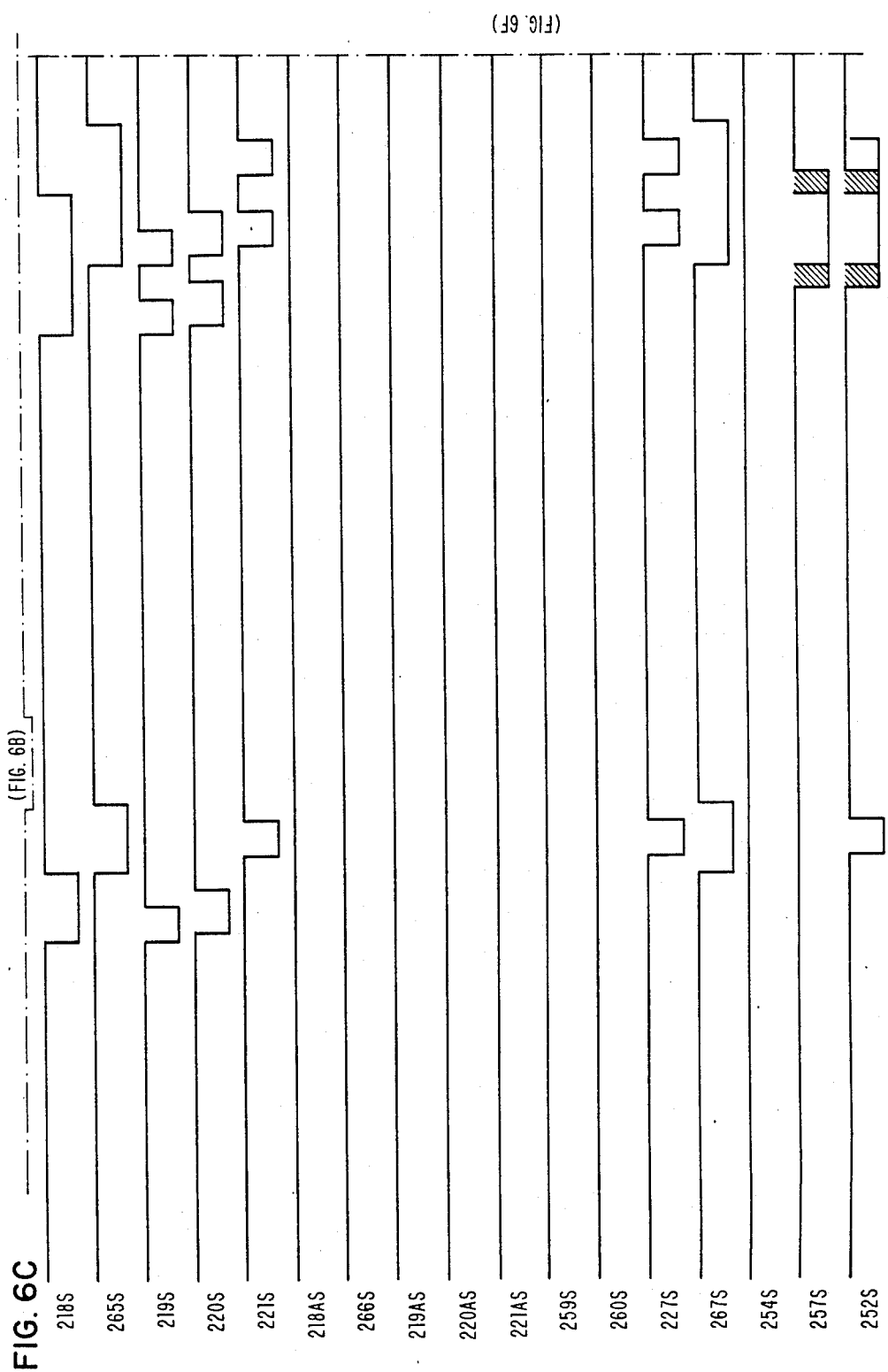

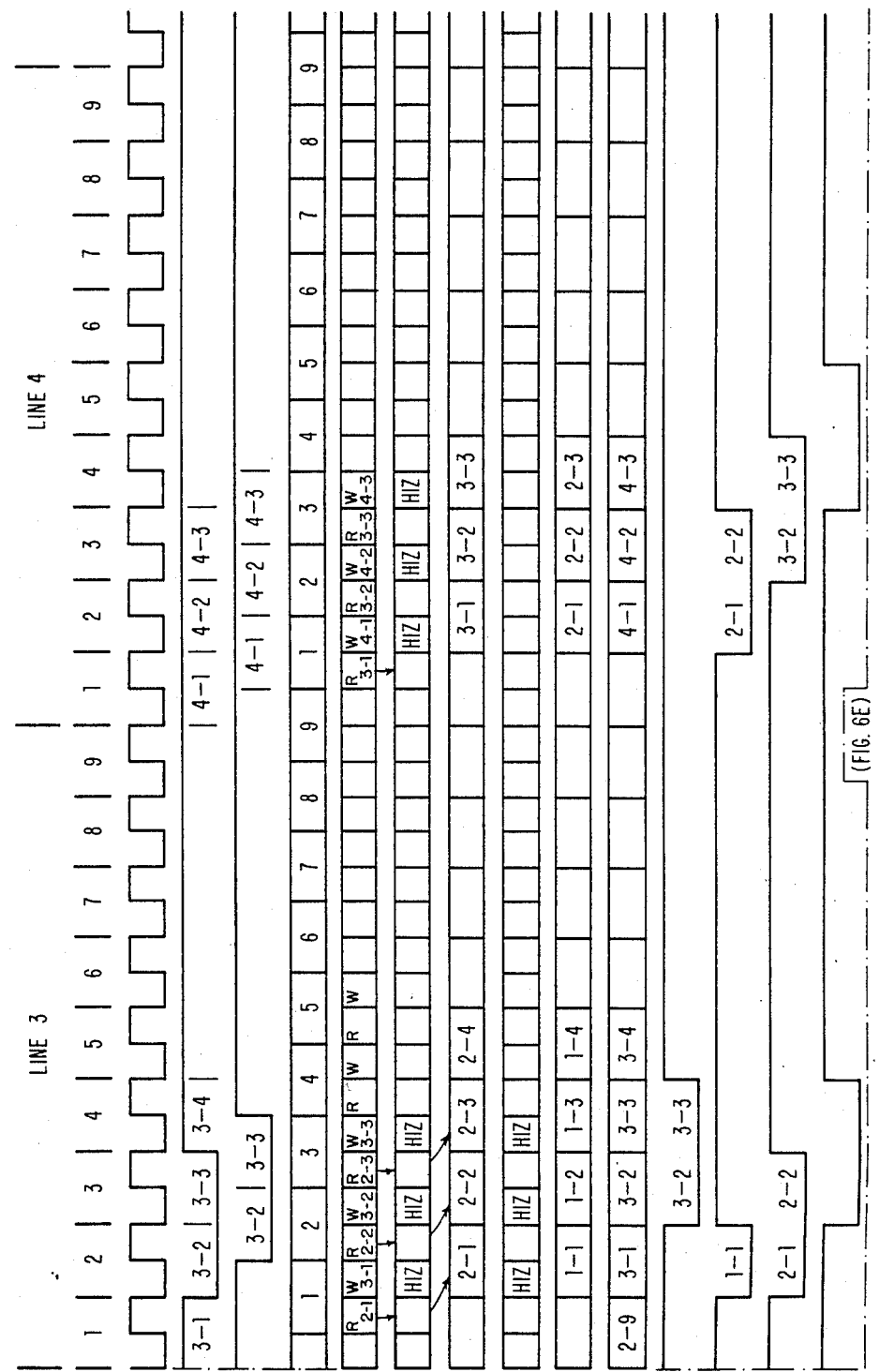

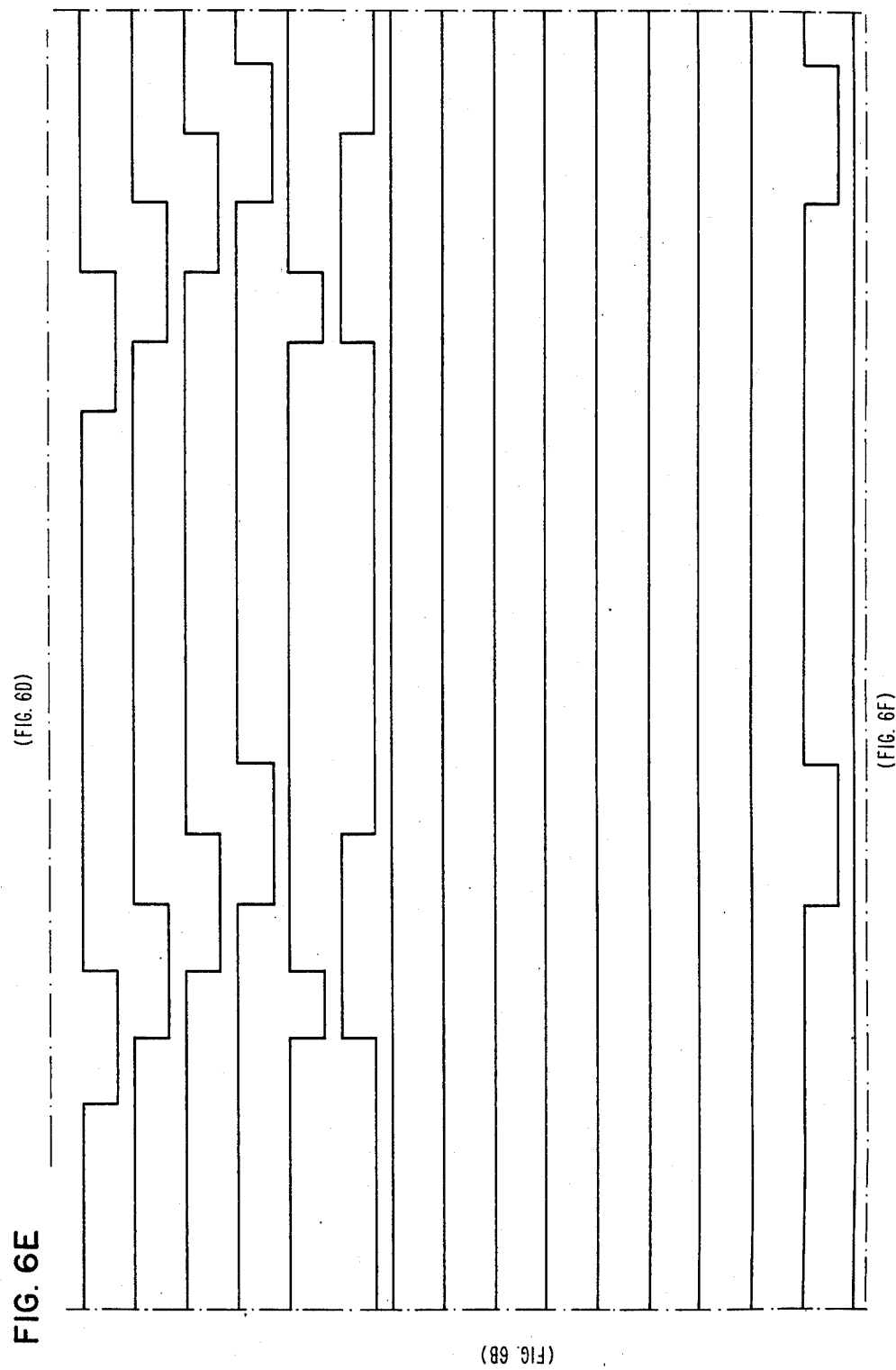

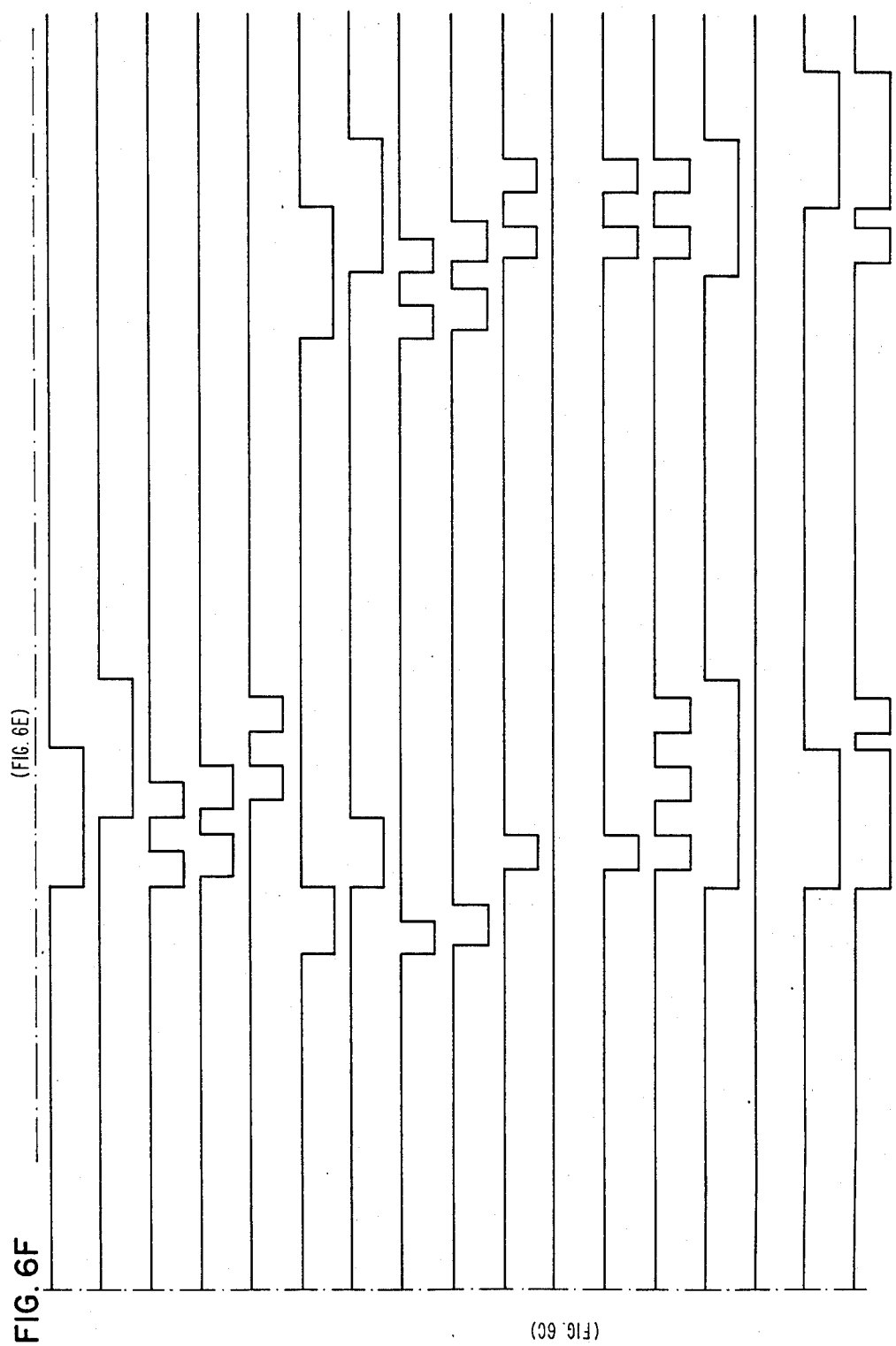

NORMAL DATA

ENHANCED DATA

WIDENED BLACK LINE

NORMAL DATA

ENHANCED DATA

PRINTED OUTPUT

NORMAL DATA

ENHANCED DATA

NORMAL DATA

WIDENED BLACK LINE

PRINTED OUTPUT

ENHANCED DATA

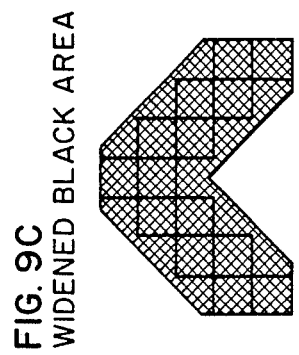
FIG. 9C
WIDENED BLACK AREA
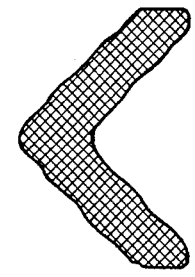
FIG. 9F
PRINTED OUTPUT
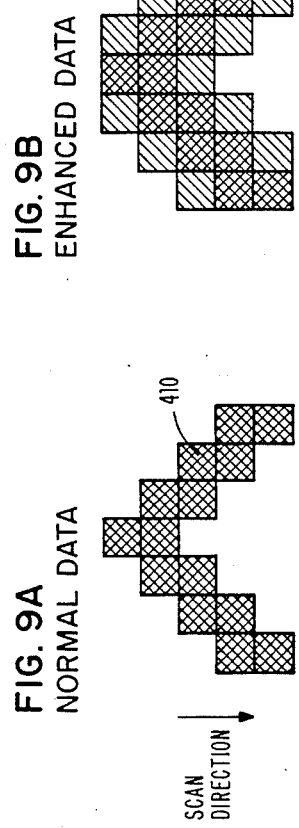
FIG. 9A
NORMAL DATA
FIG. 9B
ENHANCED DATA
SCAN DIRECTION
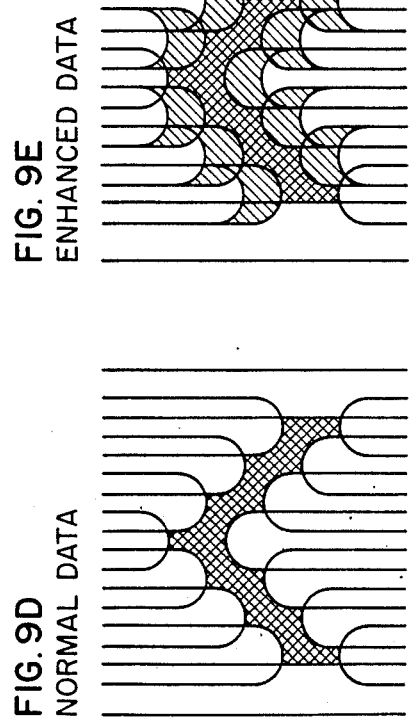
FIG. 9D
NORMAL DATA
FIG. 9E
ENHANCED DATA

NORMAL DATA

ENHANCED DATA

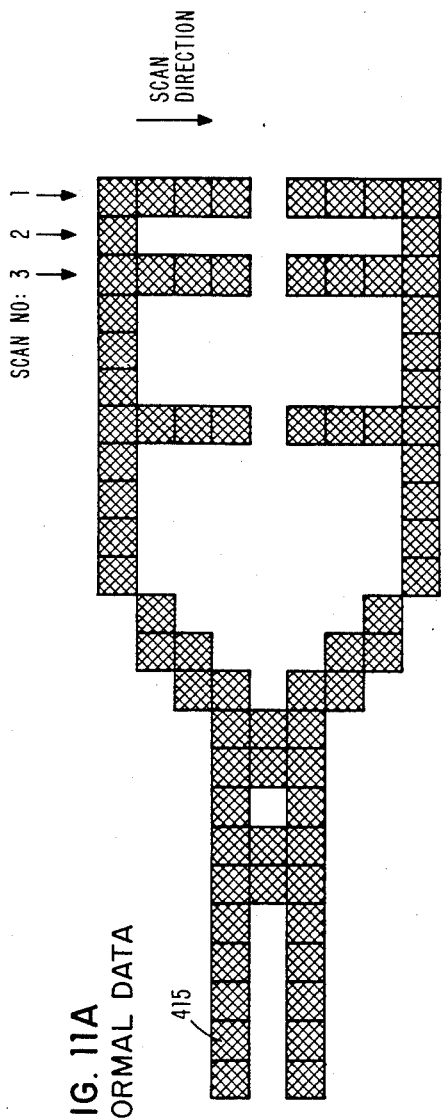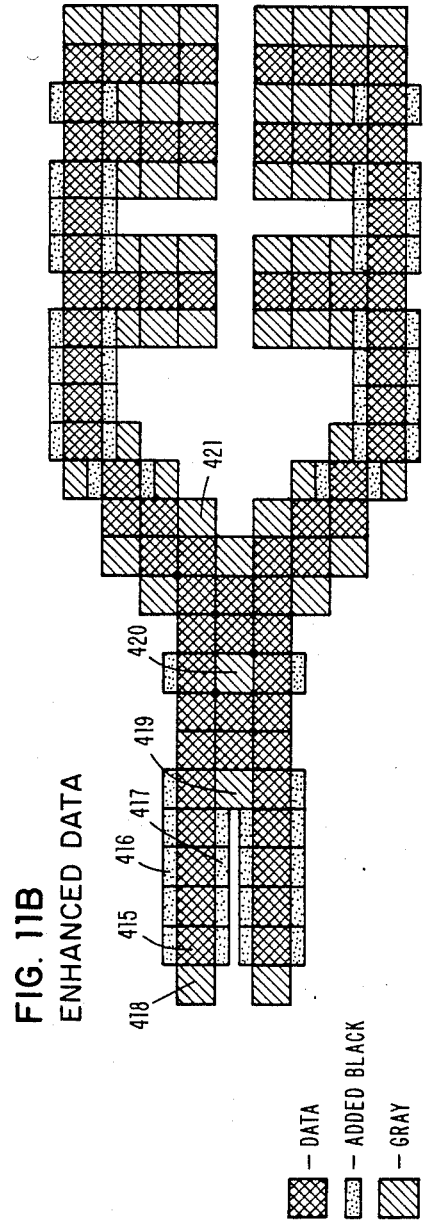

INTERACTING PRINT ENHANCEMENT TECHNIQUES

This invention relates to printing machines such as an electrophotographic machine and more specifically relates to enhancing the printing of fine lines together with enhancing the printing of diagonal lines and provides for interactions between the enhancement techniques.

RELATED INVENTIONS

U.S. Pat. No. 4,460,909, filed Dec. 18, 1981, relates to a method and apparatus for enhancing print produced by a printer such as an electrophotographic printer. In that invention, gray picture elements are added at certain transition areas between white and black picture elements. The purpose is to smooth transitions along diagonal lines where staircase effects are sometimes visible to the human eye.

U.S. Pat. No. 4,544,264, filed concurrently herewith, relates to method and apparatus for enhancing the printing of fine lines in either of two perpendicular directions by broadening the fine line. For a fine line in a direction perpendicular to the scan direction, expanded picture elements are produced to broaden the line. For a line parallel to the scan direction, lines are broadened by producing gray picture elements directly adjacent the fine line.

BACKGROUND OF THE INVENTION

Many printing machines are designed to create an image by placing a series of picture elements (pels) on the image receiving material. For example, in electrophotographic printing machines, an image may be created by a light source which is caused to scan across photosensitive material in a succession of scan lines. The light beam places a series of overlapping pels on the charged surface of photosensitive material. Each pel is placed in a pel area and the light beam is modulated so that some pel areas are exposed to light and some are not. Wherever a pel containing light strikes the photosensitive material, it is discharged. In that manner, the photosensitive material is caused to bear a charge pattern of pels which images the subject that is being reproduced. The printed copy is obtained by developing the charge pattern and transferring the developed image to print material, usually paper.

The resolution of images produced by a laser electrophotographic machine is generally stated in the number of pels produced per inch. For example, a 300-pel per inch electrophotographic printer has higher resolution than a 240-pel per inch (about 100 pels per cm) printer. While the visual characteristics of print are generally better when a higher number of pels per inch are used, in one area the visual characteristics are made worse. That area is the printing of narrow fine lines, for example, lines of a single pel width. The reason is that as the number of pels per inch increase, the width of a single pel decreases. This decrease in pel width is made even more severe by the overlapping pel structure used in electrophotographic printing machines. The invention of U.S. Pat. No. 4,544,264, filed concurrently herewith, is apparatus and technique to cause the enhancement of the printing of fine lines such as lines of a single pel width and to provide for such enhancement in two dimensions. That is, the printing of fine lines in a direction perpendicular to the scan direction is enhanced as well as the printing of fine lines which occur in a direction parallel to the scan direction.

At a resolution of 240 pels per inch, lines printed parallel or perpendicular to scan print with very little visible distortion. However, diagonal lines print with a staircase distortion which is quite visible to the human eye. U.S. Pat. No. 4,460,909 describes apparatus and tecnnique for smoothing the visible digitization present in diagonal lines.

SUMMARY OF THE INVENTION

This invention provides apparatus and technique for enhancing the print quality of an electrophotographic printer or any printer capable of producing an intermediate visual level such as gray, a foreground visual level such as black, and a background visual level such as white. The invention combines techniques of smoothing digitized staircase effects with the technique of broadening fine lines.

In performing the smoothing function, gray picture elements are produced along both edges of the slanted line. In the broadening function, gray picture elements are added directly adjacent foreground elements in a first dimension. In a second dimension perpendicular to the first dimension, expanded foreground picture elements are produced. In a scanning laser printer, the first dimension is parallel to the scan direction while the second dimension is perpendicular to the scan direction. In combining smoothing and broadening print enhancement techniques, various interactions are considered and enhanced pel producing signals are inhibited in some cases. For example, if a single pel area contains both an expanded pel signal and one gray pel signal, both enhancement signals are passed; if a single pel area contains both a "leading" gray signal and a "trailing" gray signal, one of the gray signals is inhibited; if a single pel area contains two expanded pel signals, i.e., a leading foreground signal and a trailing foreground signal, and a gray signal as well, only the gray signal is passed; and finally, if two expanded pel signals occur in the same pel area, both are passed.

BRIEF DESCRIPTION OF THE DRAWING

The above-mentioned and other features and objects of this invention and the manner of attaining them will become more apparent and the invention itself will best be understood by reference to the following description of embodiments of the invention taken in conjunction with the accompanying drawing, the description of which follows.

FIG. 6 is a timing diagram for use with the circuit of FIG. 5.

FIG. 9, comprised of FIGS. 9A–9F, illustrate edge enhancement along slanted lines.

FIG. 11, comprised of FIGS. 11A and 11B illustrate a representation of an unenhanced printed end result together with a representation of the same data enhance in accordance with the circuit of FIG. 5

DETAILED DESCRIPTION OF A PREFERRED EMBODIMENT

A. In General

Figure 1:
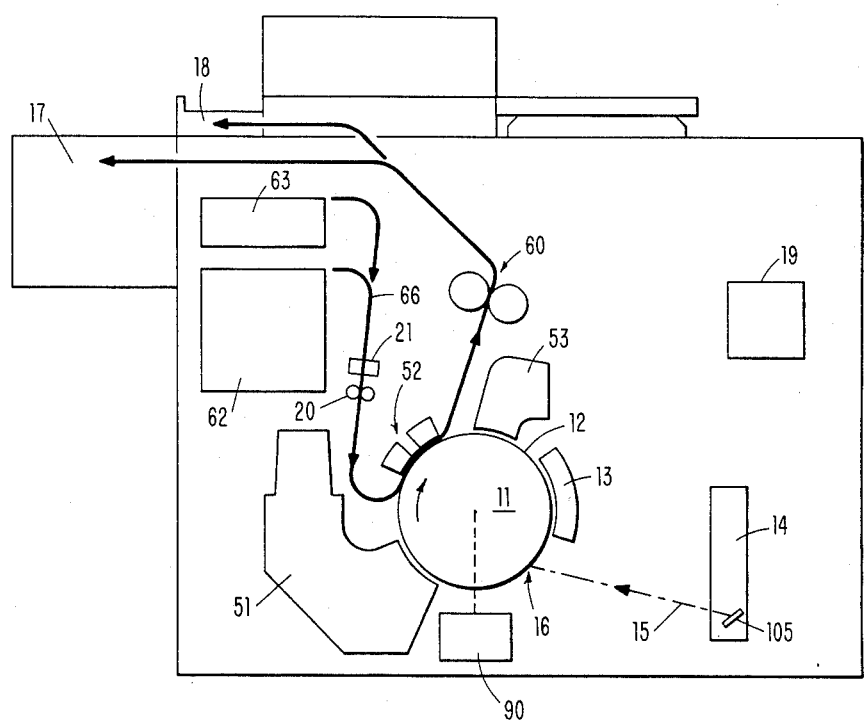
FIG. 1 shows a typical electrophotographic printing machine.

In electrophotographic printing machines, prints are produced by creating an electrostatic representation of the print on a photoreceptive surface, developing the image and then fusing the image to print material. In machines which utilize plain bond paper or other image receiving material not coated with photoreceptive material, the electrophotographic process is of the transfer type where photoreceptive material is placed around a rotating drum or arranged as a belt to be driven by a system of rollers. In a typical transfer process, photoreceptive material is passed under a stationary charge generating station to place a relatively uniform electrostatic charge, usually several hundred volts, across the entirety of the photoreceptive surface. Next, the photoreceptor is moved to an imaging station where it receives light rays generated by a light source. In electrophotographic printing machines such as the IBM 6670 Information Distributor, positive images are produced through the use of light rays which discharge the photoreceptive material in white or background areas to relatively low levels while areas which are desired to print out as dark areas continue to carry high voltage levels after the exposure. In that manner, the photoreceptive material is caused to bear a positive charge pattern corresponding to the printing, shading, etc. which is desired. In the production of a negative image used in machines such as the IBM 3800 Electrophotographic Printer, light rays are used to discharge the photoreceptive material in the foreground areas (dark areas).

After producing an image on the photoreceptor, the image is sent to a developing station where developing material called toner is placed on the image. This material may be in the form of a black powder or liquid and, in a system which produces a positive image, the material carries a charge opposite in polarity to the charge pattern on the photoreceptor. In a negative image system, the toner carries the same polarity as the charge on the photoreceptor. Because of the attraction of the charged toner to the photoreceptor, it adheres to the photoreceptor surface in proportions related to the shading of the image. Thus, black character printing receives heavy toner deposits and white background areas should receive none.

A developed image is moved from a developer to a transfer station where image receiving material, usually paper, is juxtaposed to the developed image on the photoreceptor. A charge is placed on the backside of the paper so that when the paper is stripped from the photoreceptor, the toner material is held on the paper and removed from the photoreceptor. The remaining process steps call for permanently bonding the transferred toner material to the paper and cleaning residual toner left on the photoreceptor after the transfer operation. Thereafter, the photoconductor is reused for subsequent print production.

A common variation on the above-described process used in many electrophotographic machines, involves the use of specially prepared image receiving material which itself is coated with a photosensitive material. By utilizing that technique, the image is electrostatically placed directly on the image receiving paper thereby avoiding the transfer operation. In this process, after exposure the paper is sent through a developer and then to a fuser for permanent bonding. Machines of this type avoid the residual toner problem and therefore avoid the need for cleaning stations. However, the resulting paper with its special photosensitive coating is more expensive than plain bond paper and special coating is considered to detract from the resulting product. As a consequence, coated paper machines are usually used only for low volume applications or where quality product is not essential. Production of the image on the photoreceptive surface can be produced by a scanning light beam where the desired characters are produced by driving a light generating source from information held in digital memory. The generating source may be a laser gun, an array of light-emitting diodes, etc. which direct light rays to the photoreceptor and cause it to bear the desired charge pattern.

An example of a light scanning and printing system such as is employed in the IBM 6670 Information Distributor is disclosed in U.S. Pat. No. 3,750,189. In that system, a laser beam is directed through a collimating lens system and focused as a line on a rotating mirror. The reflected beam is passed through a combination of a toroidal and a spherical lens to focus the line image on the final image plane, that is, the photoreceptor. The shape of the focused beam on the photoreceptor is designed to be slightly elliptical in order to compensate for the different image forming properties of the optical system in the scan and nonscan directions.

The type of light source provided in the IBM 6670 Information Distributor is a helium-neon laser generating source. This source provides a continuous laser beam which is modulated by an acousto-optic modulator to carry the digital information desired for reproduction. The current invention may be used with a helium-neon laser source but the particular implementation to be described herein is designed for use with a solid-state laser source. Modulation of a solid-state laser source is usually accomplished by switching the laser beam on and off in accordance with the digital information desired for reproduction. An optical system for use with a solid-state laser generating source is the subject of U.S. patent application Ser. No. 472,430, filed on Mar. 7, 1983. That patent application describes an optical system which includes an achromatic doublet lens positioned adjacent to the solid-state laser generating source together with an aperture located just prior to the achromatic doublet lens. The doublet lens collimates the beam and passes it to a cylindrical lens for focusing the beam onto the surface of a rotating mirror and then through a toroidal lens together with a spherical lens to focus the beam onto a moving photoreceptive surface.

Whether a continuous laser beam modulated by an acousto-optic modulator or a solid-state laser beam modulated by a switching circuit is used, the resultant image is formed by a series of overlapping picture elements, each picture element being small relatively circular dots placed adjacent to each other in an overlapping relationship. Adjacent pels overlap along each scan line and also overlap with adjacent pels on directly adjacent scan lines.

FIG. 1 shows a typical electrophotographic laser printing machine. An electrophotographic drum 11 is driven by motor 90 in direction A. Drum 11 carries photosensitive material 12 which passes under a charge corona generator 13 to charge the photoreceptive material to a suitable voltage. Next, the photoreceptive material 12 is discharged at exposure station 16 in accordance with the image desired to be reproduced. That image is produced by a module 14 consisting of a character generator and a laser printhead which produces the modulated laser beam 15. Next, the latent image is developed at the developer station 51 and transferred by a transfer corona generator 52 to image receiving material (typically copy paper) traversing the paper path 66. Photoreceptive material 12 then continues to the cleaning station 53 before repeating the cycle to receive another image. Copy paper may be stored in either bin 62 or 63 and fed into the paper path 66 to a gate 21. Copy paper is released by gate 21 and passed along the paper path through pinch rolls 20 through the transfer station 52 and on to the fusing rolls 60. The finished print is then passed to an exit pocket 18 or to a finishing station 17. Module 19 represents the control circuits which operate the machine in its intended manner and may be based on any suitable microprocessor or set of microprocessors.

Figure 2:
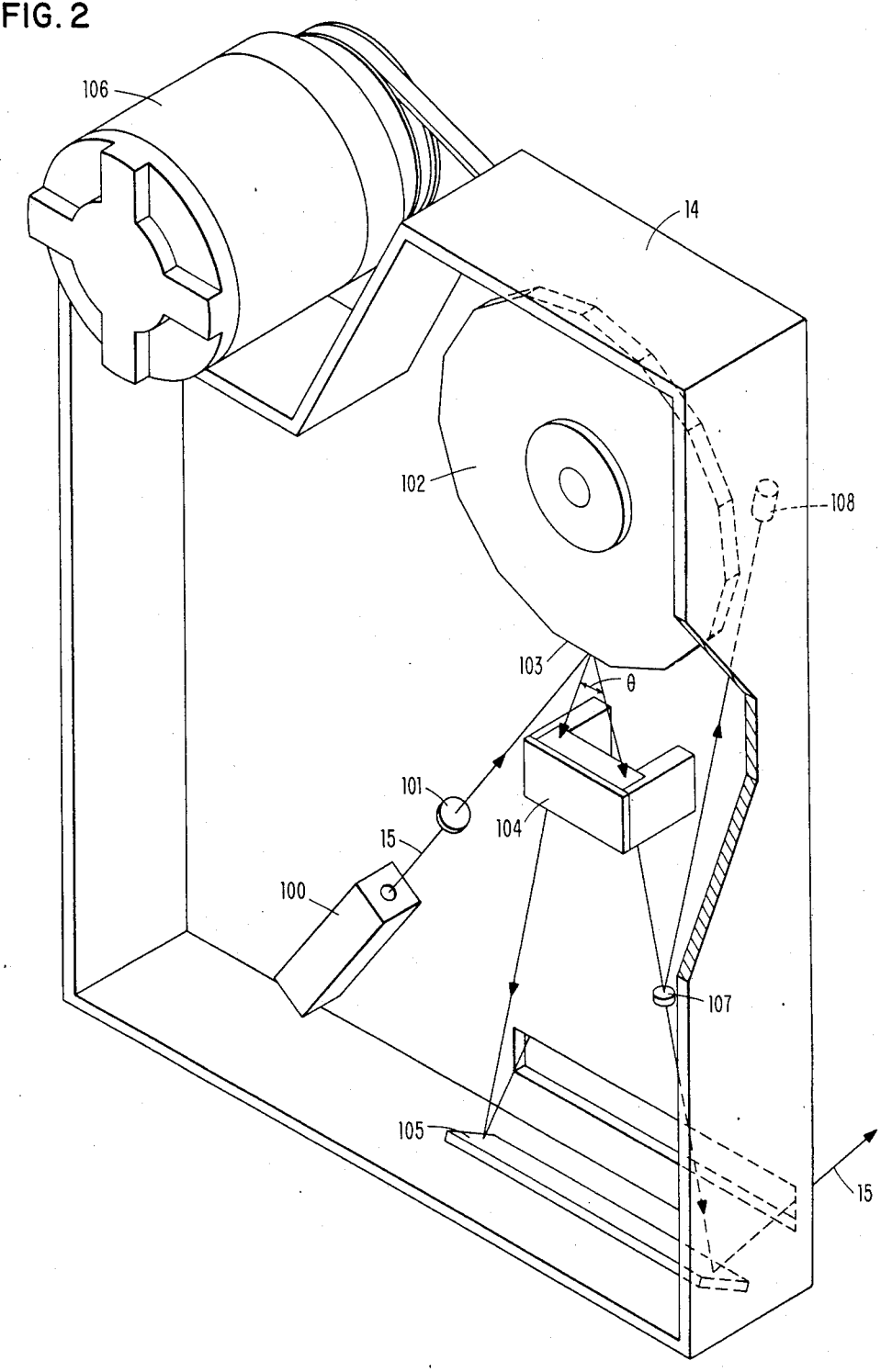
FIG. 2 shows solid-state laser apparatus for producing a scanning laser beam for the machine of FIG. 1.

Optical system module 14 is shown in detail in FIG. 2 where a solid-state laser chip and a collimating lens are housed in assembly 100. Laser beam 15 passes from assembly 100 through cylindrical lens 101 to a rotating mirror 102 which has a plurality of facets such as facet 103 around its periphery. The laser beam is reflected from a single facet at a time in such a manner as to scan through an angle θ. As each succeeding facet of the rotating mirror 102 rotates into position to receive beam 15, another scan through the angle θ begins. Upon reflection from the rotating mirror facet, the laser beam is passed through assembly 104 at which a toroidal lens and a spherical lens are used to finally shape the beam and to focus it on the photoreceptive surface 12 shown in FIG. 1. A beam fold mirror 105 is shown in both FIGS. 1 and 2 illustrating the final folding mechanism to direct the laser beam to the photoreceptive surface 12. Motor 106 is provided to drive the rotating mirror 102 while a start-of-scan mirror 107 is provided to direct the laser beam to a start-of-scan detector 108.

It should be noted that a single scan line on photoreceptive material 12 is produced by the reflection of the laser beam across a single facet on rotating mirror 102. The scan line is comprised of a succession of overlapping picture elements (pels) which may be, for example, 240 pels per inch. In such a case, each square inch on the photoconductor would carry 240×240 pels. The photoreceptor may be scanned in either a vertical or a horizontal direction relative to the receiving material, it may be scanned from either left or right, the scan can proceed from top to bottom, or bottom to top depending upon the particular implementation in the machine. Finally, to produce a positive image, the light beam is modulated to print the background while in a negative system the laser beam is modulated to produce the printing.

B. The Enhanced Result

Before describing the particular embodiment in the implementing circuits shown in FIGS. 3-6, reference is made to FIGS. 7-10. These figures illustrate the results obtained through use of the print enhancement technique. The figures illustrate results obtained regardless of whether positive or negative development occurs. Fine line data is illustrated as data of one pel in width.

Figure 7A:
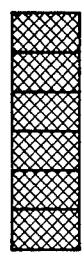
FIG. 7, comprised of FIGS. 7A-7F, are diagrams illustrating the enhancement of lines perpendicular to the scan direction.
Figure 7B:
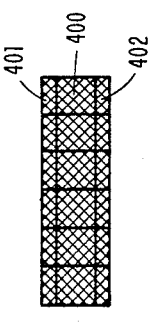

FIG. 7A shows a model of normal nonenhanced data with a single pel foreground (black) line perpendicular to the scan direction A. The line is comprised of six black pels 400. FIG. 7B shows the enhanced data model produced through use of the circuits explained herein. In this case, the black pels 400 have been expanded on the leading edge by a small added black area 401 and on the trailing edge by a small black area 402. Each of the six pels comprising the one pel line are expanded in a similar manner.

Figure 7C:

FIG. 7C illustrates a model of the widened black line that the enhanced data of FIG. 7B will produce.

Figure 7D:
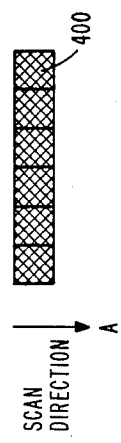

FIG. 7D relates to FIG. 7A in that it provides a representation of the normal nonenhanced data on the photoreceptive surface showing the overlapping nature of the pel structure as the scan lines are produced. Note that the all white data of scan 1 overlaps with the data of scan 2 that contains the first black pel of the line. Similarly, the all white pels of scan 8 overlap with the last black pel of the line in scan 7. The result is a somewhat shortened black line at both ends. More importantly, note that there is a similar overlapping of white pels with the single black pel within the scan line itself resulting in a single black pel line width somewhat narrower than one pel size.

Figure 7E:
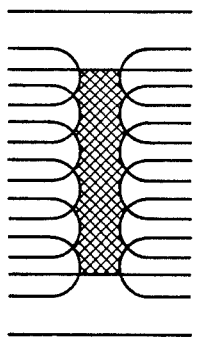

FIG. 7E is a representation of a line on the photoreceptive surface as it appears through use of the enhanced data producing means of the instant invention. Note that in this case, the enhanced data is produced by turning the laser off sooner and on later thereby widening the line.

Figure 7F:
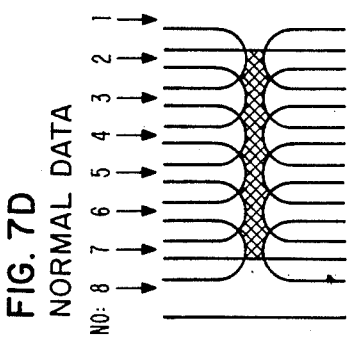

FIG. 7F the actual printed output where line width has been increased in accordance with the enhanced data to assure quality printing of a single pel wide line in the direction perpendicular to scan.

Figure 8A:
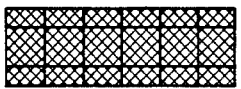
FIG. 8, comprised of FIGS. 8A-8F, illustrate the enhancement of lines parallel to the scan direction.

FIG. 8A illustrates a model of normal, nonenhanced data for a line which is to be printed parallel to the scan direction. In this data model, the line is one pel in width comprised of six pels 404.

Figure 8B:
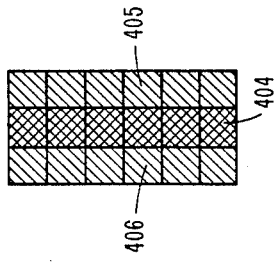

FIG. 8B is a model of the enhanced data showing that each black pel 404 has been surrounded on each side in a direction parallel to the scan direction by a leading gray pel 405 and a trailing gray pel 406.

Figure 8D:
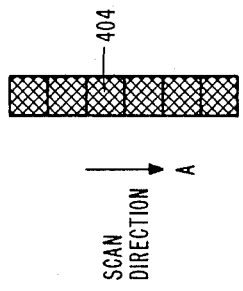
Figure 8C:
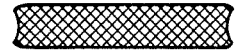

FIG. 8C is a model of the result whereby the single width black pel has been expanded by surrounding the black pel with directly adjacent gray pels.

FIG. 8D is a representation of the nonenhanced single pel width line 407 on the photoreceptive surface in the direction parallel to scan. Because of the overlapping pel structure from scan line to scan line, the foreground line 407 is actually less than one pel in width.

Figure 8F:
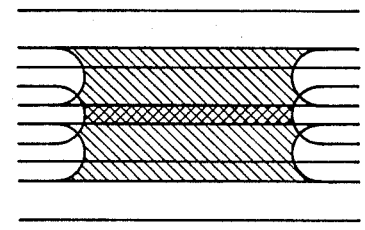
Figure 8E:
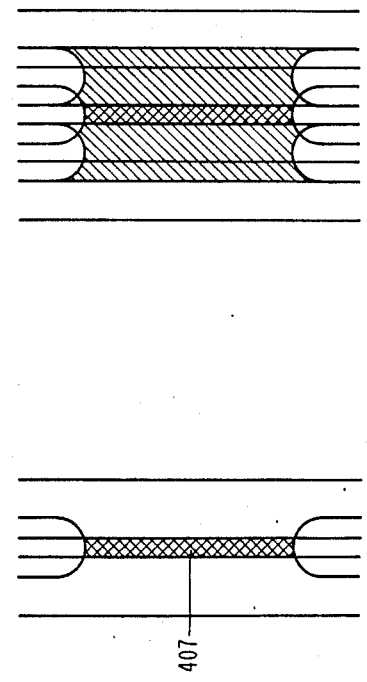

FIG. 8E shows a representation of the enhanced data on the photoreceptive surface where gray is placed at the data transitions from white to black and from black to white.

FIG. 8F is the actual printed output where the black line has been expanded by the presence of the gray data. No gray is visible.

FIG. 9, comprised of FIGS. 9A–9F, illustrates the effects of the enhancement circuits on the edges of slanted lines. That is, lines neither perpendicular to scan nor parallel to scan. FIG. 9A is a model of normal nonenhanced data where the black pels 410 provide a staircase effect on each transition from black to white and from white to black.

FIG. 9B is a model of enhanced data showing the locating of gray pels at each transition from black to white and white to black.

FIG. 9C is a model of the output exhibiting reduced digitization due to the filling caused by gray energy density levels in the electrophotographic process. No gray is visible.

FIG. 9D shows a representation of normal nonenhanced data as it might appear on a photoreceptive surface illustrating again the overlapping nature of the pel structure and a visible digitization effect.

FIG. 9E is a representation of enhanced data on a photoreceptive surface where gray pels are located directly adjacent black pels on both sides of the black lines.

FIG. 9F is the actual printed output with the reduced digitization caused by the addition of black pels along the transition areas.

Figure 10A:
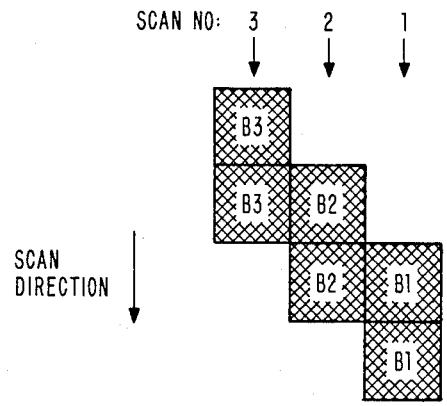
FIG. 10, comprised of FIGS. 10A and 10B, show unenhanced data and the placement of gray energy density levels to enhance the same data in accordance with the circuit of FIG. 5.

FIG. 10A shows normal nonenhanced data where $B_1$ denotes a black pel in scan 1, $B_2$ denotes a black pel in scan 2, and $B_3$ denotes a black pel in scan 3.

Figure 10B:
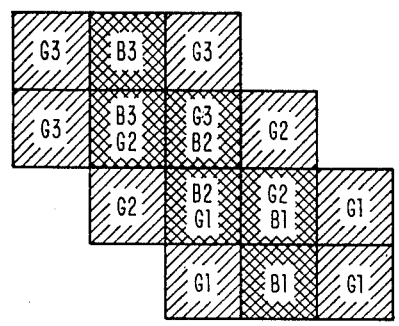

FIG. 10B shows the enhanced data produced by the circuits to be described below illustrating that the data in scan line 1 is first printed as gray then as black during the next scan line, and finally as gray again during the second succeeding scan line. In those pel locations where both black and gray coincide, the black overwrites the gray. In the illustration shown in FIG. 10B, $G_1$ denotes a gray pel corresponding to the black pel in line 1. Similarly, $G_2$ denotes a gray pel corresponding to the black pel in line 2 and $G_3$ denotes a gray pel corresponding to the black pel in line 3.

FIG. 11A shows normal print output produced without the use of the print enhancement techniques of this invention. In FIG. 11A, the scan direction is once again from top to bottom and successive lines are printed from right to left.

FIG. 11B illustrates the same data shown in FIG. 11A where the print enhancement features of the circuits to be described below have been included. In FIG. 11B, normal data 415 has been expanded at leading edges 416 and trailing edges 417 where the data 415 comprises a single pel line in a direction perpendicular to scan. Gray pels 418 have been added at each transition from black to white or white to black. An exception to the above description is shown at pel location 419 in which a gray pel appears but the added black at the trailing and leading edges of single pel line have been inhibited. This condition is also present at pel location 420. Note also that pel location 420 would receive both a trailing gray and a leading gray signal. The trailing gray signal is inhibited in the implementation described below.

FIGS. 7–11 show a print enhancement technique which meets the objective of enabling reliable printing of single pel data while simultaneously reducing digitization errors in the slanted character strokes. It differs from the related patent applications named above in that it combines both single pel and edge (smoothing) enhancements into a single enhancement technique. Combining the two enhancements into one is not simply a superimposition of the two techniques; if that were done, it would lead to interactions which would actually degrade print quality.

C. The Circuits

Figure 3:
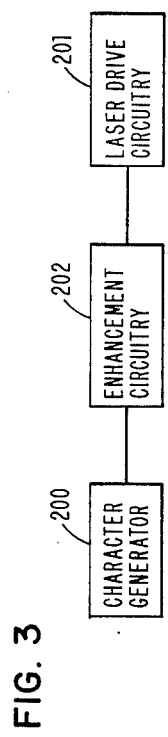
FIG. 3 is a block diagram showing the position of enhancement circuitry in accordance with this invention.

FIG. 3 is a block diagram showing the position of circuit components to enhance the printed image according to this invention and is directed to an embodiment for use with the electrophotographic laser printer shown in FIGS. 1 and 2 A character generator 200 provides signals to modulate the laser beam 15 (FIG. 2) to provide the desired characters. Data from the character generator is provided to laser drive circuitry 201. As shown in FIG. 3, the circuit of this invention provides print enhancement circuits 202 between the character generator and the laser drive circuitry so that the enhancement techniques may be carried out.

Figure 4:
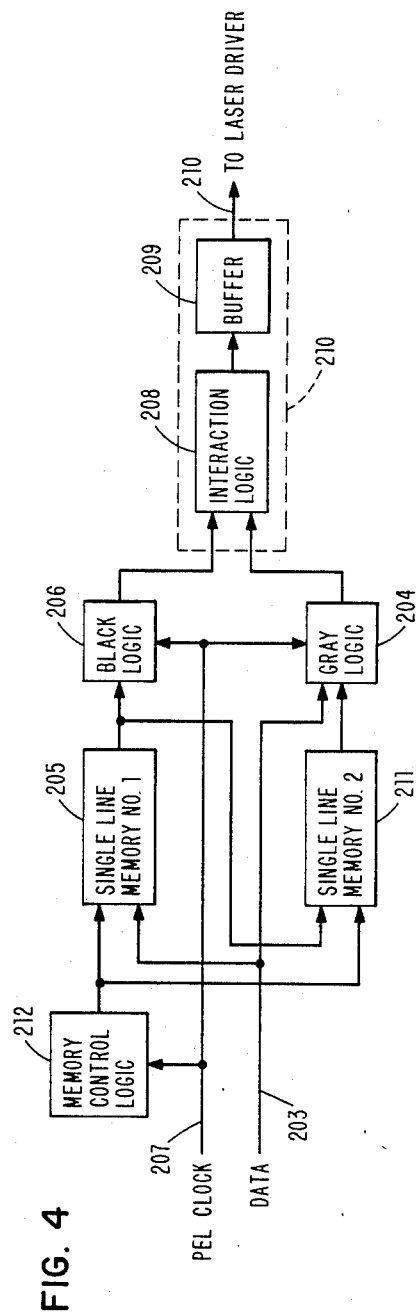
FIG. 4 is a block diagram of the enhancement circuitry of FIG. 3.

FIG. 4 is a more detailed block diagram of the enhancement circuitry 202. In FIG. 4, incoming data from the character generator is received on line 203 as input to the gray logic circuits 204 and the single line memory number one 205. In the logic circuit 204, the incoming data is analyzed so that gray pels may be produced corresponding to any foreground data on incoming line 203. Incoming data is clocked into single line memory number one 205 by memory control logic 206 from pel clock signals on line 207. It should be noted that the output of the gray logic circuit 204 is passed through the interaction logic 208 and the buffer 209 to appear on line 210 as input to the laser driver. Thus, the circuits shown in FIG. 4 produce gray pels corresponding to each of the black data on the first scan line.

When data for the second scan line appears on line 203, that data is clocked into gray logic circuit 204 and on to the laser driver. Second line data is also stored in single line memory 205. At the same time, the first line data is clocked out of memory 205 to the black logic circuit 206 where the black data in the first scan line is then passed to the interaction logic circuit 208, buffer 209, and onto the laser driver. The black logic circuit 206 expands single pel black data occurring in a direction perpendicular to scan. Note also that as the data from the first scan line is read out of memory 205, it is also read into the single line memory number two, 211.

When data corresponding to the third scan line appears on line 203, it is sent to the gray logic circuit 204 and on to the laser driver. Third line data is also read into memory 205. Simultaneously, data from scan line 2 is read out of memory 205 into the black logic 206 and on to the laser driver. Second line data is also read into memory 211. Also simultaneously, data from the first scan line is read out of the single line memory 211 into the gray logic circuit 204 and on to the laser driver.

To summarize the operations shown in FIG. 4, when the line of data is generated by the character generator, the enhancement circuitry causes it to be printed as gray data; it is simultaneously stored in a single line memory. When the next (second) line of data is generated, it is printed as gray and stored in a single line memory; the first line of data is read out of memory, printed as black, and is restored in a second memory. When the third line of data is generated, line 1 is read from the second memory and is printed once again as gray; line 2 is now printed as black and restored in the second memory; line 3 is printed as gray and is stored in the first memory. This process is repeated for each subsequent line. In this manner, each line is printed three times, first as gray, then as black, and then again as gray. It should be noted that black overwrites gray, that is, if both black and gray occur simultaneously, black is printed.

Note that the memory control logic 212 provides the proper clocking and read/write control functions required by the two single line memories. The black logic 206 detects single pel data and performs the necessary black data pulse width modifications. The gray logic 204 generates gray pulses of the proper predetermined width at the required pel positions. The interaction logic 208 examines both black and gray data and performs the logical functions necessary to provide the proper interaction responses, that is, to inhibit the expanded portion of a black signal under certain conditions or if both a leading and a trailing gray signal are present to inhibit one or the other. Buffer circuit 209 provides the voltage and current levels required by the laser driver.

Figure 5A:
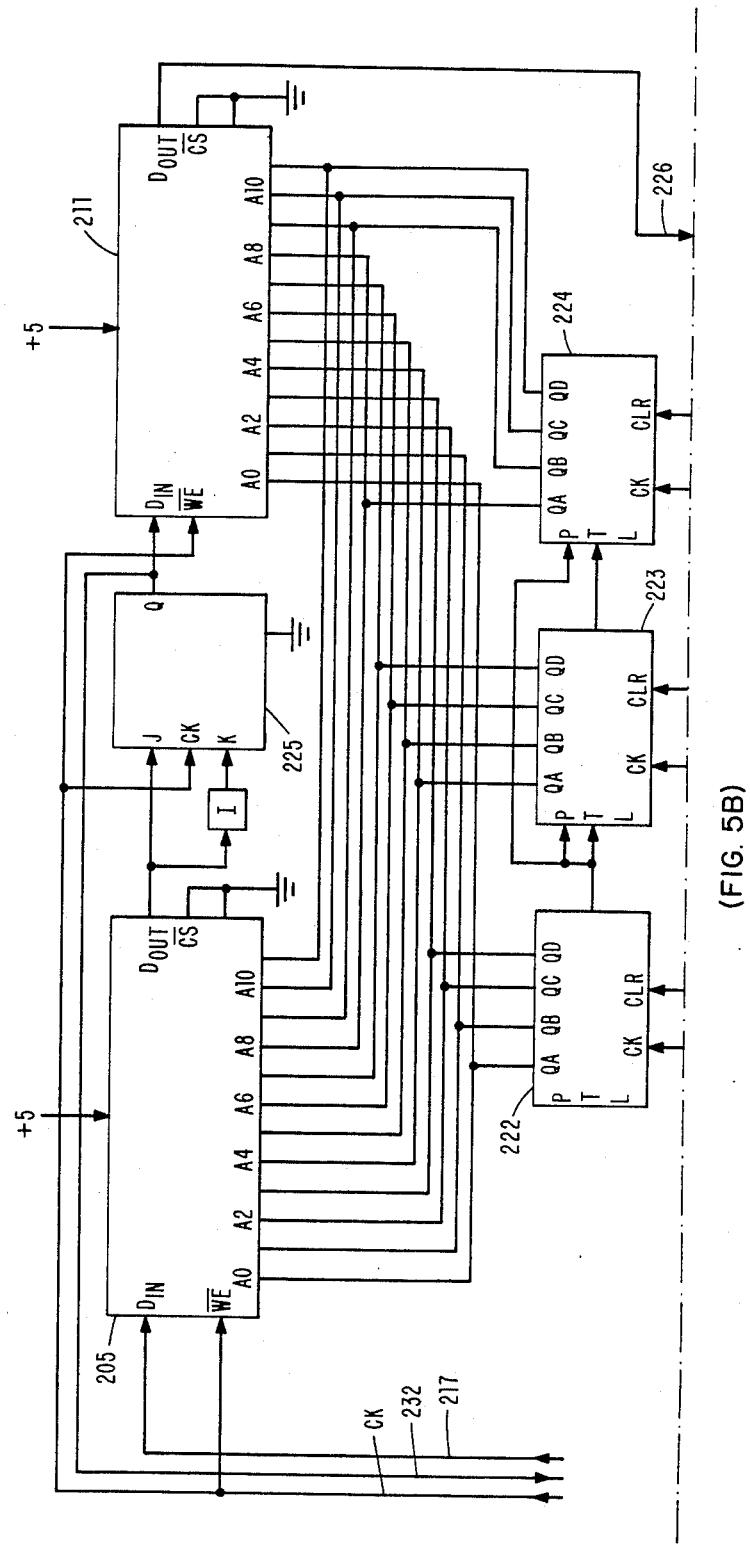
FIG. 5 is a detailed circuit diagram of a particular embodiment of the enhancement circuitry.
Figure 5B:
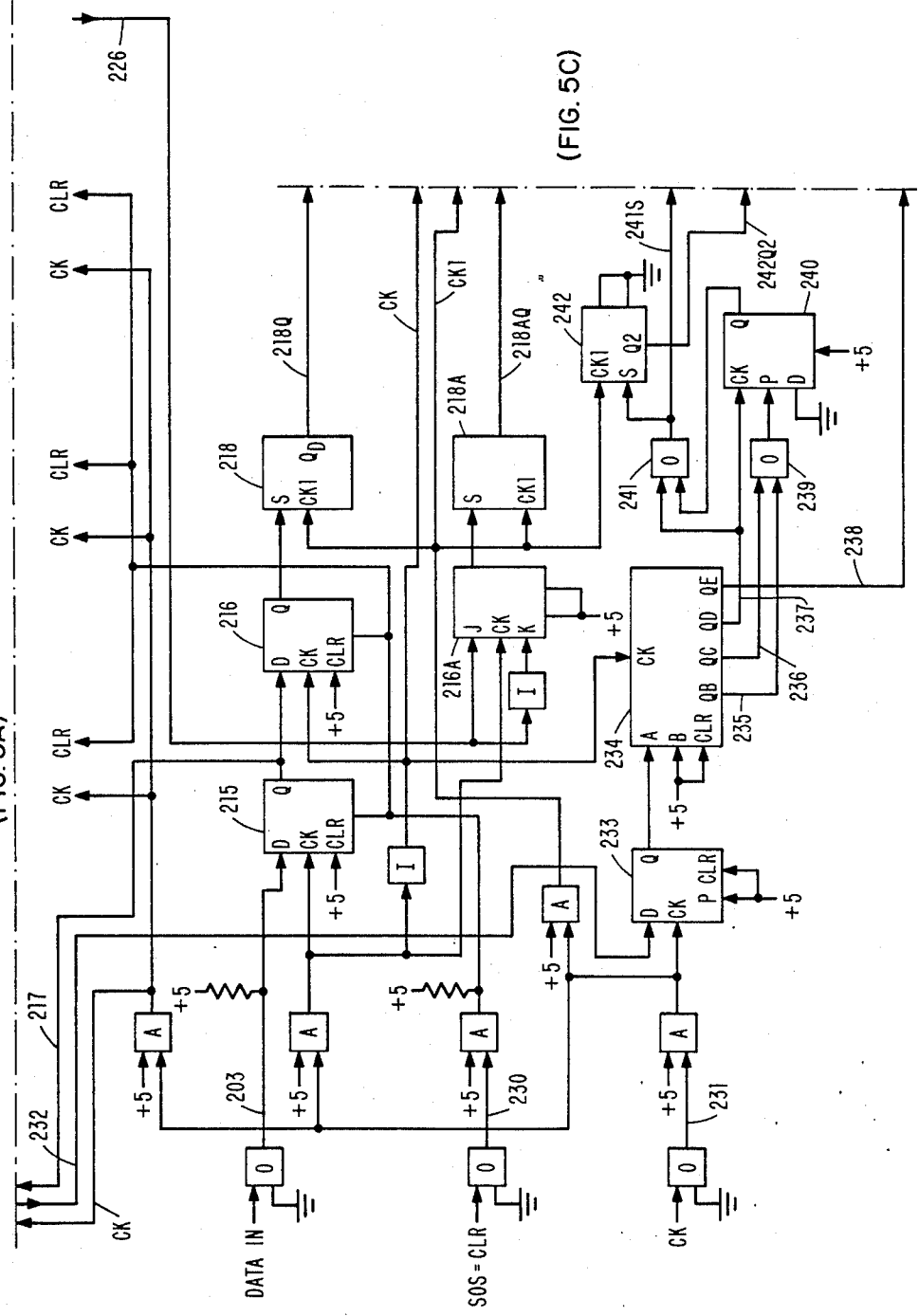
Figure 5C:
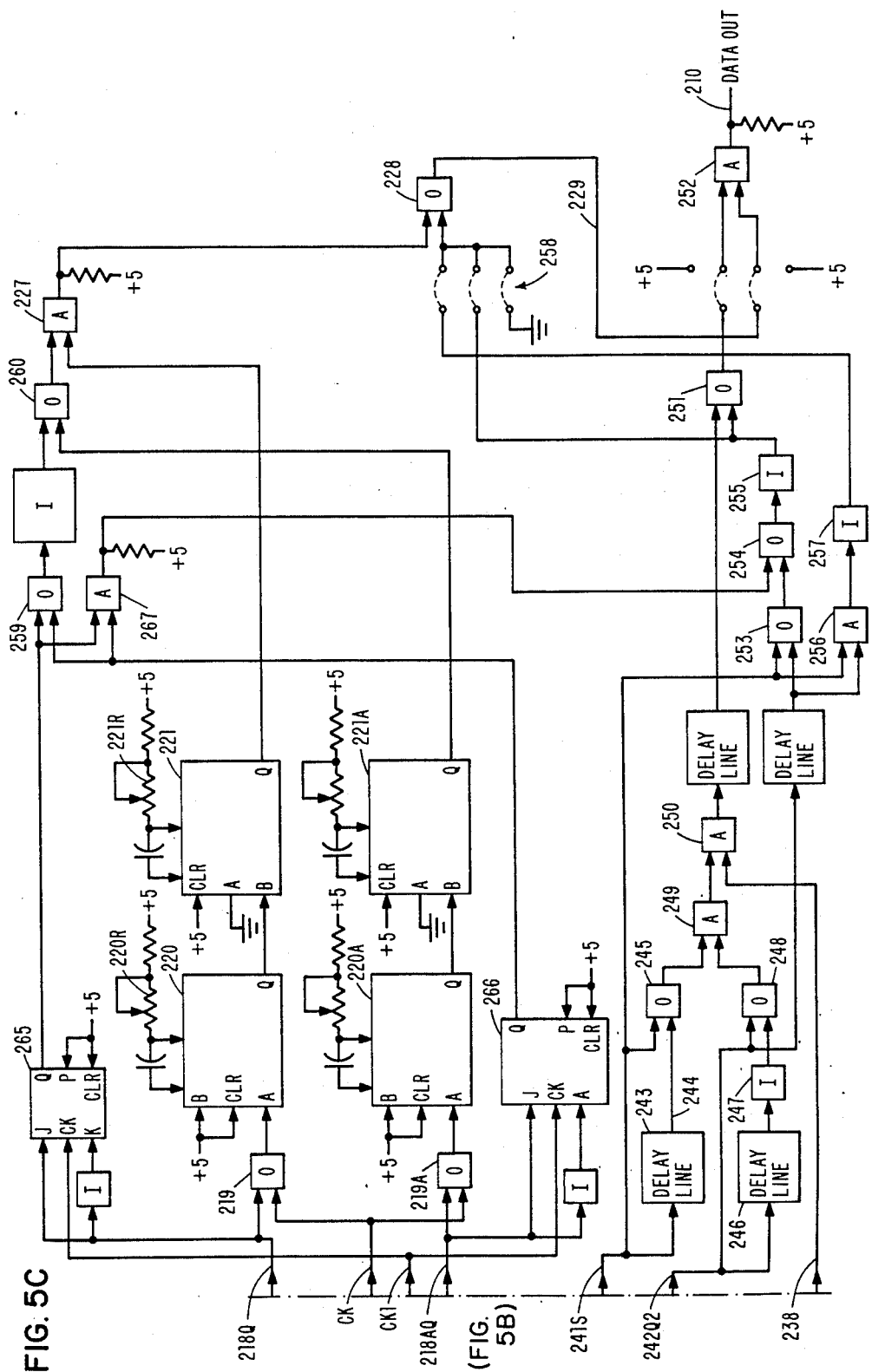

FIG. 5 is a detailed circuit diagram to implement the block diagram shown in FIG. 4. In FIG. 5, data signals are received from character generator 200 (FIG. 3) on line 203 and are passed into latch 215. The output of latch 215 is passed into the gray logic circuit the first element of which is latch 216. Simultaneously, the output of latch 215 is passed over line 217 into the first memory 205.

Continuing first with a description of the gray logic, note that the output of latch 216 is connected to shift register 218. After the appropriate time delay, the output of shift register 218 is passed to OR circuit 219 before presentation to the single shot circuit 220. The output of single shot circuit 220 is passed to a second single shot circuit 221, the output of which represents a gray signal corresponding to black signals in the incoming data on the first line. In the terminology which will be used herein, this is termed leading gray data since they precede the black data of line one by one line.

Returning now to the output of latch 215, note that it is transferred over line 217 to the first memory 205. Circuits 222, 223, and 224 are counters providing memory address control for both the first memory 205 and the second memory 211. In that manner, the data of line one is stored in memory 205 at the same time that it is processed in gray logic circuit 204 as described above.

The output of memory 205 is connected through latch 225 to the input of second memory 211 where the first line is stored again during the reception of second line data. When the third line data is received, first line data, the output of memory 211, is passed over line 226 to latch 216A. The output of latch 216A is passed to shift register 218A. After the appropriate time delay, the output of circuit 218A is passed to OR circuit 219A and then into the first single shot 220A and the second single shot 221A. The output signal of 221A represents a gray signal corresponding to each black signal in the first data line, which data was printed as black on the preceding line. Therefore, in the terminology to be used herein, the output signal of circuit 221A is a trailing gray signal. The trailing gray and leading gray signals are passed to an AND circuit 227 and from there to OR circuit 228. OR circuit 228 is connected to the gray output line 229 which forms one of the signals passed to the output data line 210.

Initialization of the circuits is accomplished by a start-of-scan signal provided over line 230 and the circuits are clocked by a clock signal provided over input line 231.

Note that the output of latch 225, that is, the output of the first memory 205 is connected to the second memory 211 but is also connected over line 232 to latch 233. The output of latch 233 is sent to shift register 234 which is the first element of the black logic circuitry. The output of shift register 234, delayed by two cycles, appears on line 235. The output delayed by three cycles appears on line 236. A delay of four cycles appears on line 237 and a delay of five cycles appears on line 238. OR circuit 239 adds the outputs on lines 235 and 236 and provides a signal to the preset input of latch 240. The output of latch 240 is added to the data signal on line 238 at OR circuit 241. The output of circuit 241 is sent to shift register 242 and also to delay line 243. Delay line 243 provides a variable time delay, the output of which is passed over line 244 to OR circuit 245. The output of OR circuit 245 is a leading black signal, that is, the added black signal appearing at the leading edge of each single pel data in a direction perpendicular to scan.

Note that the output of shift register 242 is sent to variable delay line 246 the output of which is connected through inverter 247 to OR circuit 248. The output of OR circuit 248 is termed the trailing black signal and represents that added black portion on the trailing edge of single pel data in a direction perpendicular to scan. The trailing black signal and the leading black signal are ANDed together by circuit 249 and sent to AND circuit 250 where added black signals are ANDed with the data signals delayed by five cycles from shift register 234. The latter signal represents the black data signal in the line to be printed. As a consequence, the output of circuit 250 contains both leading black, added black and black data signals for the line to be printed. After passing through OR circuit 251, this black data is sent to the AND circuit 252 wherein the black signals are ANDed with the gray signals and sent across output line 210 to the laser drive circuit. OR circuit 251 provides an inhibition of added black signals under certain conditions.

The inhibiting circuits include OR gates 253 and 254 with inverting circuit 255. The ability to program the type of inhibiting possible is provided by AND gate 256, inverter 257, and the three position switch 258. Another inhibiting circuit relating to a combination of leading gray pels and trailing gray pels in the same pel area involves the inverting OR gate 259 and OR gate 260.

D. Circuit Operation

FIG. 6 is a timing diagram which will be used to explain the operation of the circuit shown in FIG. 5. FIG. 6 shows four lines of data, each line comprised of nine pels, that is, nine clock cycles.

The CK signal shows the clock cycle input to the circuits of FIG. 5 through input line 231. The data input signals DI are shown and are input to the circuits of FIG. 5 on line 203. The illustrative data input shown in FIG. 6 provides an all white signal in line 1 except for one black pel occurring at the first pel location. In line 2, an all white signal is present except for two black pels occurring at pel locations 1 and 2. In line 3, two black pels occur at locations 2 and 3. Signals 217S of FIG. 6 are the incoming data signals 217S on line 217, that is, the output of the latch 215. The effect of the latch is to delay the incoming data by one-half cycle. The MAC signals of FIG. 6 show the memory address control signals output from counters 222, 223 and 224. The memory address control clocks from a rising edge on the clock cycle to read data from the memory while on the trailing edge the input data is written into the memory. The R/W signals of FIG. 6 show the read/write memory cycle.

Signals 205S show that the output of the first memory 205 is read out on one half cycle. The second half cycle is a high impedance half cycle in which no data is read from the memory. Signals 225S show the output of memory 1 after being latched for a full cycle in latch 225. Signals 225S are input to the second memory 211 and are also processed in the black logic circuit before delivery to the laser printhead. Signals 226S are the output of the second memory 211. Finally, signals 216S are the input to the gray logic circuit and are the same as the data in signals delayed by one cycle.

After all processing takes place in the logic circuits of FIG. 5, the data in signal at line 203 will be presented to the printhead as gray signals but will have been delayed by six cycles, that is, six pel areas. In a printer with the resolution of 240 pels per inch (approximately 100 pels per cm), the resultant displacement of data is about 0.74 millimeters. Thus, in a scanning system which scans from top to bottom, the data is moved down the page by 0.74 millimeters as a result of processing by the print enhancement circuit of FIG. 5. As already mentioned, line 1 is printed as gray data as it is put into the circuit and is delayed and printed as black data during the printing of the second line. Therefore, in a scanning system which scans from right to left, the data of each line is printed as black data after a shift toward the left of one pel. The total shifting occurring as a result of the implementation shown in FIG. 5 is therefore six pels down (in the scan direction) and one pel left (a direction parallel to scan).

Continuing now with a description of the timing circuit shown in FIG. 6, a signal level representation of signal 216AS is illustrated. This signal is processed to produce the trailing gray area and corresponds to the data in line 1 delayed by two lines, that is, it corresponds to the output of black data from memory 2.

The data to be printed is the output of memory 1, that is, signal 225S. As shown on FIG. 6, a black data signal corresponding to the black data signal input from line 1 is processed during the input of line 2. The output of shift register 234 signals 234D1-D5 are the data shifted by one to five cycles. It should be observed from FIG. 5 that signal 234D5 corresponds to the input data delayed by six cycles and it is this data that is the print data supplied to AND circuit 250, OR circuit 251, and to the data out signal on line 210. Note that signal 234D5 represents the black print data and it is to this data that the gray and added black signals will be added.

Signals 239S of FIG. 6 represent the output of OR circuit 239 (FIG. 5) which adds data signals 234D2 and 234D3. During the processing of line 1 data (the output of memory 1), signals 234D2 and 234D3 do not overlap since the input data is only a single pel wide. During the processing of line 2, however, which occurs during the input of line 3, signals 234D2 and 234D3 overlap such that an output low signal appears. Signals 239S are latched at latch 240 which produces output signals 240S. Those signals are added to data signals 234D4 by OR gate 241 providing signals 241S. The observation may be made that signals 241S contain a low signal corresponding to the presence of single pel data such as was present at line 1 but contain no low signal when multiple pel data is present such as in lines 2 and 3. Therefore, the function of circuits 239, 240, and 241 is to isolate one pel data so that such data can be broadened in a direction perpendicular to scan. The circuits filter out multiple pel data. The remainder of the black logic circuit acts upon signals 241S to provide the necessary expanded leading and lagging edges.

The leading edge expansion is provided by delay line 243. Trailing edge expansion is provided first by delaying signal 241S two cycles through shift register 242 and then acting upon those signals in delay line 246. Signals shown in FIG. 6 include the output of shift register 242 delayed by one and two cycles, that is, signals 242D1 and signals 242D2. The output signals for the delay circuits are shown at 246S and 244S. The leading black signals 245S are the output of OR circuit 245 which adds the delay signals 244S to signals 241S. Similarly, the signals to expand trailing edges are provided at signals 248S by adding the inverted delayed signals 248S with signals 242D2. Signals 249S represent the ANDing together of the leading edge and trailing edge expansion signals and signals 250S add the expansion signals to the data signals to provide the final print black signal.

Circuit 251S acts upon the signals 250S to inhibit the added black expansion pulses if two of these pulses are in the same pel area together with a gray pulse. The example shown in FIG. 6 at 251S does not provide a pel area of that type.

The following signal representations to be described from FIG. 6 will illustrate the operation of the gray logic circuits. Already noted above is the fact that the leading gray signals are derived directly from the data in on line 203. These signals are fed through latches 215 and 216 to a shift register 218 which delays the data signals by four pels as shown at signals 218S on FIG. 6. An added pel of delay is provided by latch 265 such that signals 265S represent the input signal delayed by six pels. Signals 219S represent the adding of the clock signal with signals 218S. This signal is used as input to single shot circuit 220 to provide signals 220S. Single shot 220 operates to delay the output signals 220S by an amount determined by setting the adjusting resistor 220R. Signals 220S are fed to single shot 221 to provide output signals 221S. The length of signals 221S are set by adjusting the resistor 221R. Thus, single shot circuits 220 and 221 provide a shaping of the gray signal in which circuit 220 delays the leading edge of the signal in the pel period and circuit 221 sets the duration of the signal. In that manner, a signal pulse proper to provide a discharge of the photoconductor to the gray level is provided and can be positioned at any desired portion of the pel period.

The trailing gray signals are provided in a manner similar to that for leading gray signals except that the input data comes from the output of memory 211, that is, memory 2. Those signals 226S are provided to shift register 218A through latch 216A. Signals 218AS are shown on FIG. 6 and represent data from memory 2 delayed by an additional four cycles. Those signals are fed to latch 266 for a delay of an additional cycle as shown by signals 266S. OR circuit 219A adds signals 218AS with clock signals to provide signals 219AS. Those signals are used as input to single shot circuit 220A which sets the leading edge of the trailing gray signal as shown by signals 220AS. Those signals are used as input to single shot circuit 221A to set the duration of trailing gray pulses as shown by signals 221AS.

One of the requirements of the invention is to inhibit either the leading gray signal or the trailing gray signal when both of the signals occur in the same pel area. The reason for this is since the duration of the gray signals may not be exactly the same and since the signals may not be centered in the pel area, overlap of the two gray signals may produce an expanded signal which produces a black or nearly black signal. The circuit shown in FIG. 5 allows the leading gray signal to pass but inhibits the trailing gray signal whenever the two signals overlap. This is done by adding the leading gray signals 265S with the trailing gray signals 266S in OR circuit 259 to produce the signals 259S shown on FIG. 6. In the particular example shown on FIG. 6, such an overlapping gray condition is not illustrated. Were there such a condition, the leading gray signals would be added to the trailing gray signals 221AS at OR circuit 260 to provide signals 260S. In the example shown in FIG. 6, trailing gray signals appear in signal 260S and none are inhibited. Signals 227S, the output of circuit 227 shows the addition of signals 260S with signals 221S thus providing both leading and trailing gray signals together. Signal 227S may be connected to line 229 to provide the gray output signal to the laser printhead. However, in the circuit of FIG. 5, signals 227S are provided to OR circuit 228 where the signals are added to an input determined by the position of switch 258. In switch position 1, the gray signal is inhibited if one added black signal occurs in the same pel area. In switch position 2, the gray signal is inhibited if two added blacks and a gray signal overlap while in switch position 3, the gray signal is passed unchanged.

In the operation of the signal inhibiting circuits 253, 254, and 255, the presence of a gray area, either leading or trailing is obtained from circuit 267 by ANDing together the trailing edge and the leading edge signals as shown by signals 267S. Circuit 252 adds together pulses representing leading and trailing black pulses to provide a second input to circuit 254. Output signals 254S therefore represent signals showing an overlap of the gray area with two added black pulses. In the example shown in FIG. 6, this condition has not occurred. If signals 254S provide an inhibiting pulse signal, that signal is sent to circuit 251 to inhibit the passage of the added black portions of signal 250S. To complete the description, FIG. 6 shows the black output signals 251S and the final print output signals 252S combining both the black and gray signals. Signals 252S are sent over line 210 to modulate the printhead.

From the above description of the circuit and its operation, it may be observed that data is printed one line removed from its actual reception, that is, data that would ordinarily go to the printhead for line 1 is actually printed on line 2 because of the presence of the enhancement circuits. The data that is printed at line 1 are leading gray pels which correspond to the black pels to be printed in line 2 and when line 3 is reached, trailing gray pels are printed corresponding to the black data printed in line 2. If there are black data in line 3 overlapping with the gray signals, the black signals override the gray. It may also be observed that single pel data is isolated in order that it can be broadened in a direction perpendicular to scan. Black is added to single pel data only.

The circuit provides edge enhancement or smoothing along diagonal lines by placing gray energy density levels along the irregular or digitized edge of slanted lines. The electrophotographic process causes the steps in the digitized edge to be partially filled in. This results in a more continuous or smoother character stroke. The circuit of FIG. 5 provides gray energy density levels by duty cycle modulating the laser printhead. The laser is turned off for a short period of time relative to the normal pel period to produce a gray level.

Single pel lines parallel to the scan direction are enhanced by placing gray energy density levels on the photoreceptor along the edges of the lines. These gray levels are placed in the white space at both black to white and white to black transitions. The combined effects of the gray energy density levels in the electrophotographic process cause single pel lines parallel to the scan direction to be reliably printed. Since gray areas are placed only at transitions of lines parallel to the scan direction, stroke width variation in lines perpendicular to the scan direction are eliminated. Since gray is added at transitions of all parallel lines, not just single pel lines, a slight but not objectionable increase in stroke width occurs.

Additionally, the circuit provides for printing both one added black signal and a gray signal should they coincide in the same pel area. The circuit provides for inhibiting two added black pulses should they coincide with a gray pulse in the same pel area. Also, if two gray pulses coincide, the leading gray signal only is passed. Finally, if two added black signals coincide, both added black signals are passed. Provision is made for altering these interaction parameters if desired.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electrophotographic printing machine comprising:
   drive means;
   movable carrier means driven by said drive means;
   photoreceptive material mounted on said movable carrier means for cyclic movement through electrophotographic process stations;
   charge corona means located at a first station for placing a relatively uniform electrostatic charge on the surface of said photoreceptive material;
   exposure means located at a second station for selectively discharging the charged photoreceptive material to cause the formation of a latent image on said material;
   toner for developing said image;
   developer means located at a third station for applying said toner to said image to produce a developed image;
   image receiving material;
   transfer means located at a fourth station for transferring said developed image from said photoreceptive material to said image receiving material;
   paper storage means for holding a supply of image receiving material;
   a finishing station;
   paper forwarding means for serially moving image receiving material from said storage means through the transfer station to said finishing station;
   control means for operating said exposure means, said control means comprising:
   a character generator for producing data signals to drive said exposure means to produce the desired image on said photoreceptive material; and
   enhancement means for altering certain of said data signals before presentation of said signals to said exposure means to produce smoothing of diagonal lines on said photoreceptor and broadening of fine lines in both horizontal and vertical directions on said photoreceptor whereby a print produced from an image generated in accordance with the altered signals is of an enhanced visual quality displaying easily discernible fine lines and smooth diagonal lines.

2. The machine of claim 1 wherein said enhancement means produces a first type of altered signal to expand said data signals, the expanded signal modulating said exposure means to produce a broadened image line in a first dimension.

3. The machine of claim 1 wherein said enhancement means produces a second type of altered signal which modulates said exposure means to produce an intermediate discharge level on said photoreceptive material adjacent transitions from fully discharged levels to fully charged levels and from fully charged levels to fully discharged levels to provide broadened image lines in a second dimension perpendicular to a first dimension and to provide smoothing of diagonal lines on each side thereof.

4. The machine of claim 2 wherein said enhancement means produces a second type of altered signal which modulates said exposure means to produce an intermediate discharge level on said photoreceptive material adjacent transitions from fully discharged levels to fully charged levels and from fully charged levels to fully discharged levels to provide broadened image lines in a second dimension perpendicular to said first dimension and to provide smoothing of diagonal lines on each side thereof.

5. The machine of claim 2 wherein said enhancement means further includes:
first memory means for receiving and storing a stream of data signals such as a stream representing a first line;
means for reading said stored data signals during reception of a stream of data signals representing a second line;
means for analyzing said stream of data signals read from said first memory means to identify data signals representing fine line data, said fine line data signals having a first value level;
means for producing a leading signal of said first value level directly leading said fine line data signals;
means for producing a trailing signal of said first value level directly trailing said fine line data signals; and
means for combining said fine line data signals with said leading signal and said trailing signal to provide expanded fine line data signals of a first value level within the data signal stream read from said first memory means.

6. The machine of claim 5 wherein said expanded fine line data signals are produced for modulating an image one pel in width.

7. The machine of claim 3 wherein said enhancement means further includes:
means for receiving a stream of data signals such as a stream representing a first line;
means for operating upon said stream of data signals to produce a first separate data signal corresponding to the location of each data signal of a first level in said first line, said first separate signals capable of producing a modulated exposure to said intermediate discharge level on said photoreceptive material; and
means for supplying said first separate signals to said exposure means.

8. The machine of claim 7 wherein said enhancement means further includes:
first memory means for storing streams of data signals representing a line of data as it is received;
second memory means for storing streams of data signals representing a line of data read from said first memory means;
means for reading said data signals from said second memory means; and
means for operating upon said data signals read from said second memory means to produce a second separate data signal corresponding to the location of each data signal of a first level in said line read from second memory, said second separate data signals capable of producing a modulated exposure to said intermediate levels on said photoreceptive material.

9. The machine of claim 8 further including means for combining said first and said second separate data signals with data signals read from said first memory means before presentation to said exposure means.

10. The machine of claim 8 further including means for reducing the width of each of said first and said second separate data signals to a time period less than a full data signal.

11. The machine of claim 9 wherein said means for combining said first and second separate data signals includes means for inhibiting one of said separate data signals if they overlap with one another.

12. The machine of claim 4 wherein said enhancement means further includes:
means for receiving a stream of data signals representing a line of data signals such as a first line;
means for operating upon said data signals representing said first line to produce a first separate data signal corresponding to the location of each data signal of a first level in said first line, said first separate signals capable of producing a modulated exposure to said intermediate discharge level on said photoreceptive material; and
means for supplying said first separate signals to said exposure means.

13. The machine of claim 12 wherein said enhancement means further includes:
first memory means for storing streams of data signals representing a line of data as it is received;
second memory means for storing streams of data signals representing a line of data read from said first memory means;
means for reading said data signals from said second memory means; and
means for operating upon said data signals read from said second memory means to produce a second separate data signal corresponding to the location of each data signal of a first level in said line read from second memory, said second separate data signals capable of producing a modulated exposure to said intermediate levels on said photoreceptive material.

14. The machine of claim 13 further including means for combining said first and said second separate data signals with data signals read from said first memory means before presentation to said exposure means.

15. The machine of claim 14 further including means for reducing the width of each of said first and said second separate data signals to a time period less than a full data signal.

16. The machine of claim 14 wherein said means for combining said first and second separate data signals includes means for inhibiting one of said separate data signals if they overlap with one another.

17. The machine of claim 12 wherein said enhancement means further includes:
first memory means for receiving and storing a stream of data signals such as a stream representing a first line;
means for reading said stored data signals during reception of a stream of data signals representing a second line;
means for analyzing said stream of data signals read from said memory means to identify data signals representing fine line data, said fine line data signals having a first value level;
means for producing a leading signal of said first value level directly leading said fine line data signals;
means for producing a trailing signal of said first value level directly trailing said fine line data signals; and
means for combining said fine line data signals with said leading signal and said trailing signal to provide expanded fine line data signals of a first value level within the data signal stream read from the first memory means.

18. The machine of claim 17 wherein said enhancement means further includes:
second memory means for storing streams of data signals representing a line of data read from said first memory means;
means for reading said data signals from said second memory means; and
means for operating upon said data signals read from said second memory means to produce a second separate data signal corresponding to the location of each data signal of a first level in said line read from second memory, said second separate data signals capable of producing a modulated exposure to said intermediate levels on said photoreceptive material.

19. The machine of claim 18 further including means for combining said first and said second separate data signals with data signals read from said first memory means before presentation to said exposure means.

20. The machine of claim 19 further including means for reducing the width of each of said first and said second separate data signals to a time period less than a full data signal.

21. The machine of claim 19 wherein said means for combining said first and second separate data signals includes means for inhibiting one of said separate data signals if they overlap with one another.

22. The machine of claim 19 wherein said means for combining signals includes inhibiting means for passing only said separate data signal if said separate data signal overlaps with said leading signal and said trailing signal.

23. The machine of claim 22 wherein said inhibiting means further includes means for inhibiting one of said separate data signals if they overlap with one another.

24. In a printing machine, imaging means for producing an image to be reproduced on work material, control means for operating said image means to create the desired pattern on said material in accordance with image producing data signals, said control means including enhancement means for enhancing the print output of said printing machine by broadening fine lines occurring in two perpendicular directions and by smoothing diagonal lines to remove visually discernible digitization effects.

25. The machine of claim 24 wherein said imaging means includes light source means and means to direct illumination in a scanning motion across work material comprised of photoreceptive material and wherein said enhancement means broadens fine lines in a direction parallel to the scan direction and smooths diagonal lines by modulating said light source means to produce an intermediate discharge level on said photoreceptive material directly adjacent low discharge levels.

26. The machine of claim 25 wherein said enhancement means broadens fine lines in a direction perpendicular to the scan direction by modulating said light source means to produce expanded picture elements of a low discharge level on said photoreceptive material in accordance with fine line data.

27. The machine of claim 26 further including a character generator for providing a stream of data signals and wherein said enhancement means includes means for receiving said stream of data signals from said character generator and means for altering said signals to produce said broadening and smoothing effects.

28. The machine of claim 26 wherein said enhancement means produces a first type of altered signal to expand said data signals, the expanded signal modulating said exposure means to produce a broadened image line in a first dimension.

29. The machine of claim 28 wherein said enhancement means produces a second type of altered signal which modulates said exposure means to produce an intermediate discharge level on said photoreceptive material adjacent transitions from fully discharged levels to fully charged levels and from fully charged levels to fully discharged levels to provide broadened image lines in a second dimension perpendicular to said first dimension and to provide smoothing of diagonal lines on each side thereof.

30. The machine of claim 25 wherein said enhancement means produces a type of altered signal which modulates said exposure means to produce an intermediate discharge level on said photoreceptive material adjacent transitions from fully discharged levels to fully charged levels and from fully charged levels to fully discharged levels to provide broadened image lines in said direction parallel to said scan direction and to provide smoothing of diagonal lines on each side thereof.

31. The machine of claim 26 wherein said enhancement means further includes:
first memory means for receiving and storing a stream of data signals such as a stream representing a first line;
means for reading said stored data signals during reception of a stream of data signals representing a second line;
means for analyzing said stream of data signals read from said first memory means to identify data signals representing fine line data, said fine line data signals having a first value level;
means for producing a leading signal of said first value level directly leading said rine line data signals;
means for producing a trailing signal of said first value level directly trailing said fine line data signals; and means for combining said fine line data signals with said leading signal and said trailing signal to provide expanded fine line data signals of a first value level within the data signal stream read from said first memory means.

32. The machine of claim 31 wherein said expanded fine line data signals are produced for modulating an image one pel in width.

33. The machine of claim 29 wherein said enhancement means further includes:
means for receiving a stream of data signals such as a stream representing a first line;
means for operating upon said stream of data signals to produce a first separate data signal corresponding to the location of each data signal of a first level in said first line, said first separate signals capable of producing a modulated exposure to said intermediate discharge level on said photoreceptive material; and
means for supplying said first separate signals to said exposure means.

34. The machine of claim 33 wherein said enhancement means further includes:
first memory means for storing streams of data signals representing a line of data as it is received;
second memory means for storing streams of data signals representing a line of data read from said first memory means;
means for reading said data signals from said second memory means; and
means for operating upon said data signals read from said second memory means to produce a second separate data signal corresponding to the location of each data signal of a first level in said line read from second memory, said second separate data signals capable of producing a modulated exposure to said intermediate evels on said photoreceptive material.

35. The machine of claim 34 further including means for combining said first and said second separate data signals with data signals read from said first memory means before presentation to said exposure means.

36. The machine of claim 33 further including means for reducing the width of each of said first and said second separate data signals to a time period less than a full data signal.

37. The machine of claim 34 wherein said means for combining said first and second separate data signals includes means for inhibiting one of said separate data signals if they overlap with one another.

38. The machine of claim 30 wherein said enhancement means further includes:
means for receiving a stream of data signals representing a line of data signals such as a first line;
means for operating upon said data signals representing said first line to produce a first separate data signal corresponding to the location of each data signal of a first level in said first line, said first separate signals capable of producing a modulated exposure to said intermediate discharge level on said photoreceptive material; and
means for supplying said first separate signals to said exposure means.

39. The machine of claim 38 wherein said enhancement means further includes:
first memory means for storing streams of data signals representing a line of data as it is received;
second memory means for storing streams of data signals representing a line of data read from said first memory means;
means for reading said data signals from said second memory means; and
means for operating upon said data signals read from said second memory means to produce a second separate data signal corresponding to the location of each data signal of a first level in said line read from second memory, said second separate data signals capable of producing a modulated exposure to said intermediate levels on said photoreceptive material.

40. The machine of claim 39 further including means for combining said first and said second separate data signals with data signals read from said first memory means before presentation to said exposure means.

41. The machine of claim 40 further including means for reducing the width of each of said first and said second separate data signals to a time period less than a full data signal.

42. The machine of claim 40 wherein said means for combining said first and second separate data signals includes means for inhibiting one of said separate data signals if they overlap with one another.

43. The machine of claim 38 wherein said enhancement means further includes:
first memory means for receiving and storing a stream of data signals such as a stream representing a first line;
means for reading said stored data signals during reception of a stream of data signals representing a second line;
means for analyzing said stream of data signals read from said memory means to identify data signals representing fine line data, said fine line data signals having a first value level;
means for producing a leading signal of said first value level directly leading said line line data signals;
means for producing a trailing signal of said first value level directly trailing said fine line data signals; and
means for combining said fine line data signals with said leading signal and said trailing signal to provide expanded fine line data signals of a first value level within the data signal stream read from the first memory means.

44. The machine of claim 43 wherein said enhancement means further includes:
second memory means for storing streams of data signals representing a line of data read from said first memory means;
means for reading said data signals from said second memory means; and
means for operating upon said data signals read from said second memory means to produce a second separate data signal corresponding to the location of each data signal of a first level in said line read from second memory, said second separate data signals capable of producing a modulated exposure to said intermediate levels on said photoreceptive material.

45. The machine of claim 44 further including means for combining said first and said second separate data signals with data signals read from said first memory means before presentation to said exposure means.

46. The machine of claim 45 further including means for reducing the width of each of said first and said second separate data signals to a time period less than a full data signal.

47. The machine of claim 45 wherein said means for combining said first and second separate data signals includes means for inhibiting one of said separate data signals if they overlap with one another.

48. The machine of claim 45 wherein said means for combining signals includes inhibiting means for passing only said separate data signal if said separate data signal overlaps with said leading signal and said trailing signal.

49. The machine of claim 48 wherein said inhibiting means further includes means for inhibiting one of said separate data signals if they overlap with one another.

50. A method for enhancing the print product of a printing machine which produces a digitized image comprised of characters of a foreground visual quality against a background visual quality comprising the steps of:
   reading the line of data signals currently ready to print from memory means;
   receiving a line of data signals representing a line succeeding the line of data signals currently ready to print;
   reading a line of data signals representing a line preceding the line of data signals currently ready to print;
   altering signals in said preceding line of data signals of a foreground quality to produce signals of an intermediate visual quality;
   altering said line of data signals representing said succeeding line by producing signals of an intermediate visual quality in place of each signal of a foreground visual quality; and
   combining said line of data signals currently ready to print with the altered line of data signals representing said preceding line and the altered line of data signals representing said succeeding line.

51. The method of claim 50 further including the step of:
   inhibiting one altered signal when two altered signals overlap.

52. The method of claim 50 further including the steps of:
   analyzing said line of data signals currently ready to print to ascertain foreground signals one picture element (pel) wide;
   producing a leading edge foreground data signal in the time period immediately preceding said foreground signal one pel wide;
   producing a trailing edge foreground data signal in the time period immediately following said foreground signal one pel wide; and
   combining said leading edge signal and said trailing edge signal with said stream of data signals currently ready to print.

53. The method of claim 52 further including the steps of:
   inhibiting said leading edge and trailing edge signals when both of said signals overlap with an altered signal of said intermediate visual quality.

54. The method of claim 53 further including the step of:
   inhibiting one altered signal when two altered signals overlap.

* * * * *